Sept. 30, 1969   C. A. LAVERY ET AL   3,469,373
MEANS FOR DEHYDRATING CRUDE OIL WITH HOT WATER
Filed April 8, 1966   3 Sheets-Sheet 1

INVENTORS.
CHARLES A. LAVERY
PAUL E. MEYER
BY
ATTORNEY

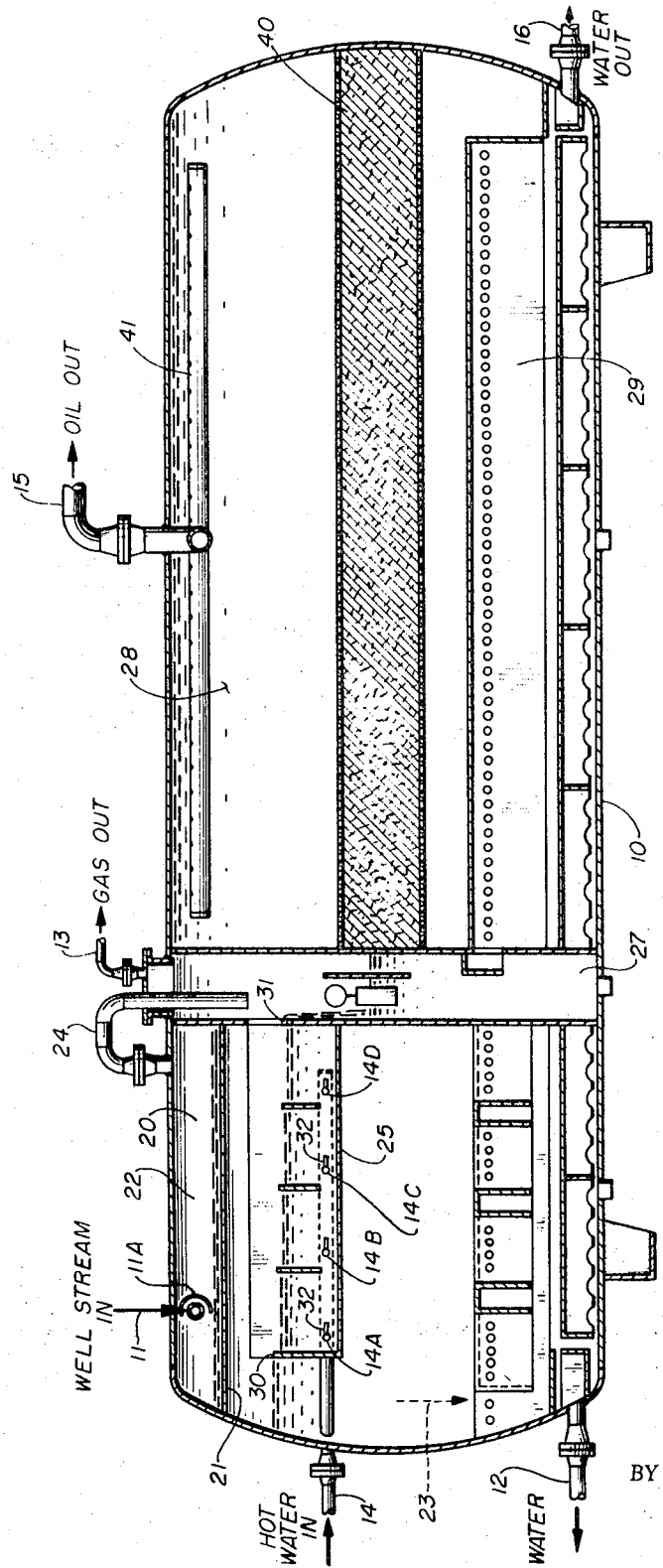

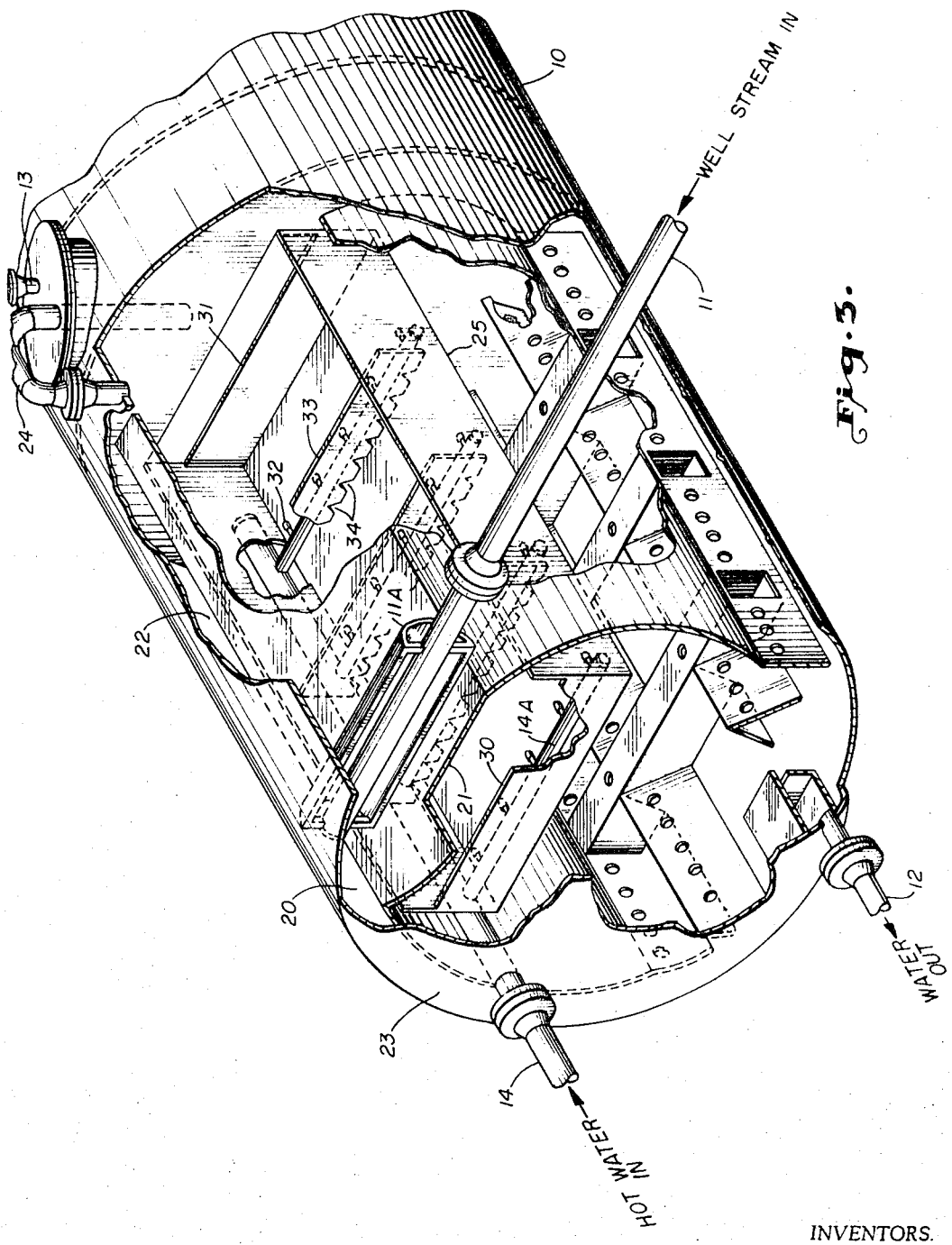

United States Patent Office 3,469,373
Patented Sept. 30, 1969

3,469,373
MEANS FOR DEHYDRATING CRUDE OIL WITH HOT WATER
Charles A. Lavery and Paul E. Meyer, Tulsa, Okla., assignors to Combustion Engineering, Inc., New York, N.Y., a corporation of Delaware
Filed Apr. 8, 1966, Ser. No. 541,369
Int. Cl. B01d *50/00, 47/00*
U.S. Cl. 55—174
1 Claim

ABSTRACT OF THE DISCLOSURE

A horizontal vessel is connected to receive oil well production. A first compartment of the vessel is connected to a source of heated water and the production so these fluids will mix on a tray mounted in the first compartment. A passage conducts the washed and heated emulsion from the tray into a coalescing compartment of the treater. Both the washing water and the coalesced water are removed from the vessel. A part of the total water is passed through a heater and returned to the tray as the source of heated water which is mixed with additional production.

---

The present invention relates to field-processing crude oil by employing heated water. More particularly, the invention relates to mixing hot water with the emulsion of a well stream to reduce the viscosity of the emulsion, rupture foam, remove solid material and prepare the emulsion for coalescence of the water therefrom.

The present invention was conceived in connection with a specific problem of providing clean oil from wells in Nigeria, Africa. As a subjective matter, the oil in this area is specified as clean if its water content is at 5% or below. It is always desirable to reduce the water content as much as possible, preferably to the order of 0.2%. However, the cost of obtaining percentages below 5% may be unrealistic. The chemical program, viscosity of the oil, amount of salt, etc. are some of the factors which set the practical level of dryness for the clean oil product.

The complete over-all, method and equipment embodying the present invention is designed to be flexible in meeting the specifications for clean oil production. Provisions are even contemplated for the equipment to be so arranged to obviate the need for the present invention if the native heat of the well stream and ambient temperature conditions are adequate to produce oil at a specified dryness. It is where additional heat is required, together with the benefit of water as a washing agent, that the present invention finds its usefulness.

It is well known to mix water with crude oil and then heat the mixture. If the water to be mixed is elevated in temperature it will reduce the viscosity of the oil, obviate foam formation and wash out solid foreign material. However, simply adding water to a well stream to treat the emlusion in that stream is not the simple solution that is always compatible with economics. Should large amounts of water be initially present in the well stream, the heat required to elevate the emulsion of that stream to the coalescing temperature and control foam formation may be prohibitively high.

The present invention addresses itself to the problem of providing separately heated water to mix with crude oil after free water of the original production has been removed. The secondary feature of the problem is reclamation of the added water, and its heat, and then recycling this water for subsequent remixing.

An object of the invention is to provide a method of economically treating crude oil with heated water when the well stream contains a high percentage of the free water.

Another object is to provide efficient mixing of the heated water and crude oil after the free water has been removed and prior to coalescence of water from the emulsion.

Another object is to recycle the heated water to conserve the water and heat of the remixed water.

The present invention contemplates treating a stream of oil well production, having a high ratio of free water, by providing a residence zone in which the free water is permitted to remove, and facilitated in removal, from the production. The mixture is then flowed into a volume wherein coalescence of the water of the emulsion is brought about. The coalesced water and the mixed heating water may then be removed, along with solid foreign matter washed from the production. At least part of this total mixed and coalesced water is then recycled through a circuit in which the water is raised in temperature to prepare it for remixing with additional emulsion.

The present invention is centralized about a shell, extending in a horizontal direction. The well stream is received into this shell, gas is evolved and discharged, free water is removed, heat is applied to the emulsion as needed to prepare it for coalescence of the water and coalescence is carried out to enable the water to precipitate from the emulsion and leave clean oil as a product. More specifically, the invention contemplates providing a shallow container beyond a point in the flow path where free water is removed from the incoming stream, the shallow container having distributing structure mounted within it for mixing hot water with emulsion in the shallow container. This mixture is then directed along a path from the container to a location where the heated water and coalesced water can be removed, along with entrained solid foreign matter. A path is then provided for recycling this water to the distributing structure.

Other objects, advantages and features of the present invention will become apparent to one skilled in the art, upon consideration of the written specification, appended claim, and attached drawings, wherein:

FIG. 2 is a sectioned elevation of the treater of FIG. 1 illustrating the basic flow paths for the well stream and mixing water within the treater; and FIG. 3 is a sectioned perspective of the end of the treater of FIGS. 1 and 2 illustrating the details of the structure directing the flows of well stream and mixing water in the treater ahead of the coalescing section of the treater.

GENERAL FLOW PATTERN

Figure 1:
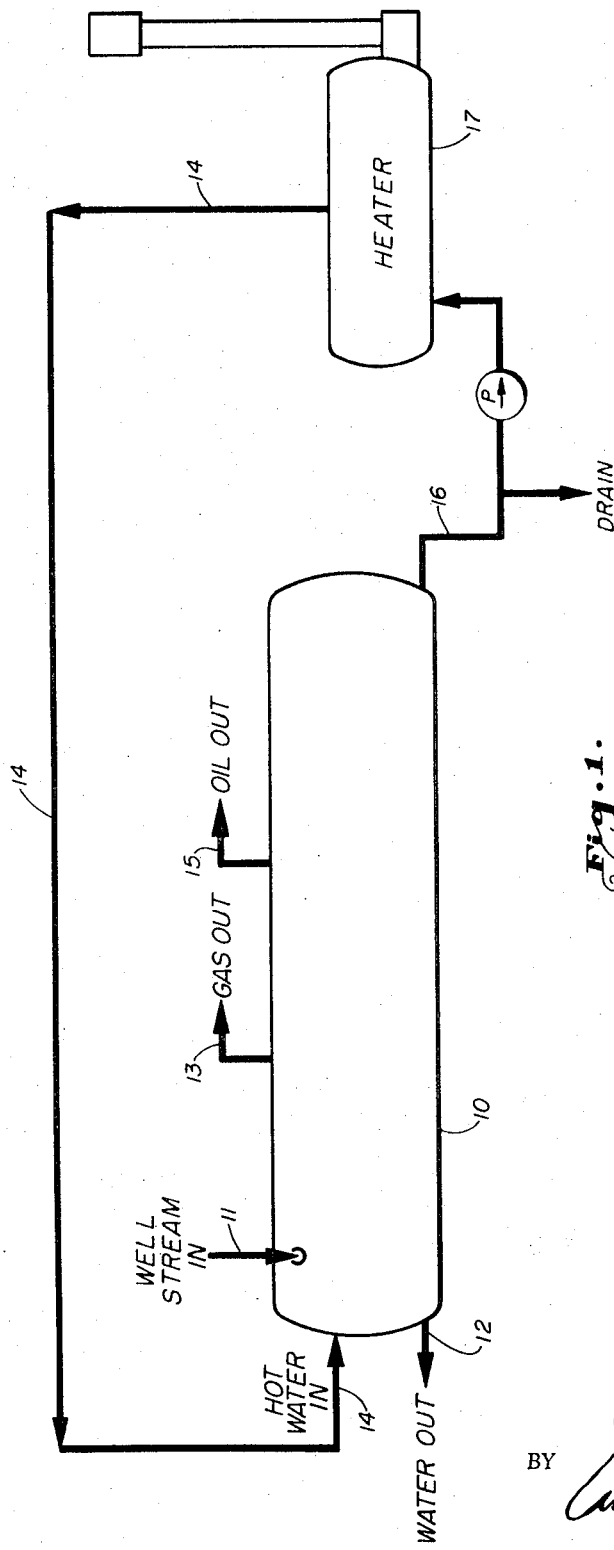
FIG. 1 is a diagrammatic representation of a treater and separate heater in a system embodying the present invention.

Referring to FIG. 1, there is depicted the elongated shell of a treater vessel 10 having its axis horizontally extended. A first compartment at one end of the shell is connected to a stream of crude petroleum in conduit 11. Means are provided in the first compartment for removing free water and free gas. The water removed in the first compartment is conducted from the shell through conduit 12. Both the free gas and subsequently evolved gas are removed from the shell through conduit 13.

Structure in the first compartment is provided for mixing a stream of heated water in conduit 14 with the oil and emulsion of the well stream. A second compartment in shell 10 is connected to the first compartment to receive the mixture of heated water and emulsion. Structure is provided in the second compartment to coalesce the water from the emulsion. The oil which remains, as the product of the process, is conducted from the treater through conduit 15. Both the heated water mixed with the well stream and the water coalesced from the well stream are conducted from the treater through conduit 16. A heater 17 is connected to the first and second compartments of shell 10 to receive the water of conduit 16, heat a portion of this water and recirculate the heated water to the mixing means in the first compartment through conduit 14.

From the foregoing description of the equipment and flow pattern of FIG. 1, the outline of a unique method can be discerned. In review, heated water is passed into, and mixed with, a well stream emulsion in quantities sufficient to elevate the resulting mixture to a temperature at which the optimum coalescence will take place. Following coalescence of water from the emulsion, the heated water and coalesced water are removed for any necessary reheating. The reheated water is then recycled to again mix with the well stream. Therefore, the invention provides a circuit for heated water to facilitate the "treatment" of a well stream. The heated water, utilized in this fashion, not only raises the temperature of the emulsion to prepare it for coalescence, but promotes the release of gas in the production, facilitates precipitation of solids from the production and ruptures foam associated with the production. Further, the water is recirculated to conserve heat input to the system and for control of its characteristics which influence its function within shell 10.

Referring now to FIGS. 2 and 3, the structure within treater shell 10 is disclosed in its function relative the well stream. Consideration of the structural arrangement begins with the introduction of the well stream into first compartment 20 through conduit 11. Partition 21 is mounted on the internal end of vessel 10 and within the first compartment 20 and is given the form of a hood having a cross-section of inverted U shape, elongated along a horizontally extended axis arranged parallel to the horizontally extended axis of the elongated shell 10. The partition 21 is spaced from the internal side walls of compartment 20, providing upper volume 22 and paths 23 which connect volume 22 with the lower portion of compartment 20.

The liquids of the well stream are directed to the top of partition 21 after impingement upon a diverter 11A within space 22. The liquids then descend on each side of partition 21, through paths 23. A conduit 24 is connected to the volume 22 for the withdrawal of gas from the volume 22.

From the lower portion of compartment 20, free water is drawn from shell 10 through conduit 12. The oil and emulsion above this body of free water is then distributed along the horizontal lower ends of the legs of the U-shaped hood 21. This distributing structure, which could take many forms other than that disclosed, is designed to distribute the oil and emulsion uniformly and horizontally between the lower ends of the legs of the hood 21. Following this distribution, the oil and emulsion rises inside the hood.

Within hood 21, in the upper portion of the volume within hood 21, a compartment 25 is mounted to receive the oil and emulsion rising inside the hood. The heated water of conduit 14 is introduced into compartment 25 from conduit 14. The introduction of the heated water is made in such manner as to mix the heated fluid with the oil and emulsion so as to raise the temperature of the emulsion high enough to prepare the emulsion for coalescence of the water in the emulsion. Also, the mixing of the heated fluid with the well stream causes the release of gas from the production, facilitates precipitation of solids from the production and ruptures foam associated with the production.

The mixture of heated water and the well stream is discharged from compartment 25 into a volume 27 which is defined in the shell 10 between compartment 20 and a second compartment 28. In volume 27, the heated water begins separation from the well stream liquids. All of the liquids are then flowed into the lower portion of compartment 28 and the oil and emulsion are distributed by structure 29 for upward movement. Coalescing structure, for the water, is provided in second compartment 28 and coalesced water descends to join the body of heated water in the lower portion of compartment 28. The oil continues to rise and is collected for conductance from the top of compartment 28 through conduit 15. The coalesced and heated water are then drawn from shell 10 through conduit 16.

Water knockout in first compartment 20

If the well stream of conduit 11 has a high ratio of water to oil and emulsion, the structure within compartment 20 performs an initial separation which saves in heat and washing water volume. The hood 21 provides the preheat paths 23 which gives the free water valuable time to be knocked from the oil and emulsion for discharge through conduit 12.

Also compartment 20 provides volume 22 in which free gas is released for withdrawal through conduit 24. Therefore, the oil and emulsion rising to compartment 25 is prepared for contact by the hot washing action of water from conduit 14.

Specifically, the oil and emulsion rise to the top edge 30 of tray-compartment 25 to flow over this edge and into the path of streams of hot water discharged along the bottom of the compartment. The flow of oil and emulsion is then the length of box 25 to the edge 31. From edge 31 the mixture of noted water and oil and emulsion fall into volume 27.

Mixing in compartment 25

Compartment 25 is, essentially, an open-topped box or a tray with sides. The entrance, for oil and emulsion, is over the edge of front end 30 and the exit over edge of back end 31. In progressing along the bottom of this tray, the oil and emulsion are thoroughly washed by the hot water to carry out objects of the invention.

The hot water is introduced at a plurality of points along the flow path of the oil and emulsion. To provide this distribution, conduit 14 has branch conduits 14A-14D extended at right angles to conduit 14, into the compartment 25, transverse the flow path of the oil and emulsion and across the width of the tray. Nozzles 32 are spaced evenly along the length of each branch conduit, extending away from front end 30 and toward back end 31.

The branch conduits 14A-14D are spaced a short distance above the floor of the tray. The nozzles 32 are preferably directed parallel to the tray floor. Any solid particles which tend to sink to the floor of the tray are washed along the length of the tray and out over the back end 31.

A transverse partition 33 is extended up from the floor of the tray, between each pair of branch conduits. A series of notches 34 are formed on the lower edge of each partition 33. This arrangement provides a series of sub-compartments within compartment 25, connected through notches 34. The oil and emulsion, and entrained solid particles, enter the first subcompartment over front end 30. The hot water from nozzles 32 mixes with the oil and emulsion and flows into the second sub-compartment by way of notches 34. The mixing with hot water continues and the mixture progressively moves down the length of tray 25.

The combined effect of jetting hot water into the oil and emulsion, toward the exit notches, thoroughly mixes the hot water with these production liquids. As the heat of the water lowers the viscosity of the oil and emulsion, the solid particles tend to settle to the tray floor. However, the jets of hot water wash the solid particles forward, through the notches and under the branch conduit on the downstream side of transverse partition 33. The result is a thorough wash of the oil and emulsion which raises the temperature of the emulsion, stimulates the release of gas, facilitates precipitation of solids and ruptures foam.

The emulsion is prepared for coalescence as it flows over back end 31 of compartment 25. In volume 27 the mixture forms a level, the water and solids separate downward and the oil and emulsion flow into second compartment 28 for distribution and upward flow.

Final step of coalescence

Once the oil and emulsion have been washed and thereby heated, the coalescence of water from the emulsion can be brought about in various ways. For the purpose of simplicity, a simple media pack, or hay section, 40 is disclosed in second compartment 26.

The oil and emulsion are distributed the length of the lower portion of compartment 28 and flow upward, through the pack 40. Water is coalesced, falls back through the upward flow, and joins the mixing water which has largely separated in volume 27. This total water is drawn from the shell through conduit 16. Any excess of water finding its way to this portion of the circuit may be drained off. The remainder is then reheated in heater 17.

The clean oil ascends in compartment 28, is collected by conduit 41 and drawn from the shell as the product of the process. This final coalescence could be carried out by an electrical structure. Actually, the final coalescence step is incidental to the basic concept. It is the preparation for this step around which the novel concept is formed.

Also, the removal of solid particles is an incidental problem. The washing provides effective disengagement of the particles from the fluids, but once they have settled to the bottom of the shell, their removal is carried out by one of the well-known techniques.

CONCLUSION

In the attempt to emphasize the simple concepts of the novel method and unique structural arrangement, many details have not been elaborately illustrated nor described. For example, the power to circulate the mixing liquid in the circuit between the treater and heater is indicated as from a pump. The liquid could be thermosiphoned. However, this is a relatively minor detail.

The drain of excess liquid from the circuit has only been indicated. This could have an elaborate control system regulating the withdrawal. This, again, is an incidental system.

The basic objectives have been set out in the first part of the specification, together with a statement of the invention. The claims follow with a specific definition of the invention, free of incidental features which do not support the simple concepts of the invention.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A system for field-processing a stream of crude petroleum containing free water and free gas, including,
an elongated shell having its axis horizontally extended,
a first compartment formed in one end of the shell with a vertical first partition and connected to a stream of crude petroleum,
a second partition mounted within the first compartment and extending from the shell end to said first partition within said first compartment, said second compartment being in the form of a hood having a cross-section of inverted U shape and being elongated along a horizontally extended axis which is arranged parallel to the horizontally extended axis of the elongated shell to form a first path between the outer surface of the partition and the inner surface of the compartment walls, the lower ends of the legs of the U-shaped hood terminating above the bottom of the first compartment,
means for discharging water at a level below the lower ends of the legs of the U-shaped hood,
a tray with four sides and an open top mounted within the upper portion of the hood and arranged to receive over one side of said tray the oil and emulsion rising inside the hood from the lower ends of the legs of the U-shaped hood,
a source of heated water connected to the tray to introduce the heated water into the tray so the water will mix with the oil and emulsion to provide the emulsion with a temperature sufficient for coalescing water therefrom,
a second compartment formed in the other end of the shell,
an opening in said first partition to conduct the heated emulsion and heated water from the tray into the second compartment in which water is coalesced from the emulsion,
conduits connected to the compartments of the shell for separate removal of the gas and oil and heated and coalesced water from the second compartment,
and means for conducting only a portion of the removed heated and coalesced water to the mixing tray as the source of heated water to mix with the oil and emulsion.

References Cited

UNITED STATES PATENTS

| 1,587,111 | 6/1926 | Fogler | 208—187 |
| 1,705,370 | 3/1929 | Meathers | 208—187 |
| 2,347,877 | 5/1944 | De Bretteville | 208—187 |
| 2,354,856 | 8/1944 | Erwin | 208—187 |
| 2,619,187 | 11/1952 | Hayes et al. | 208—187 |
| 2,620,043 | 12/1952 | Williams | 208—187 |
| 2,730,240 | 1/1956 | Johnson | 208—188 |
| 2,933,447 | 4/1960 | Walker et al. | 208—187 |
| 1,521,309 | 12/1924 | Miller et al. | 55—171 |
| 3,312,044 | 4/1967 | McCarter | 55—174 |

DELBERT E. GANTZ, Primary Examiner

G. J. CRASANAKIS, Assistant Examiner

U.S. Cl. X.R.

55—176; 208—187